…

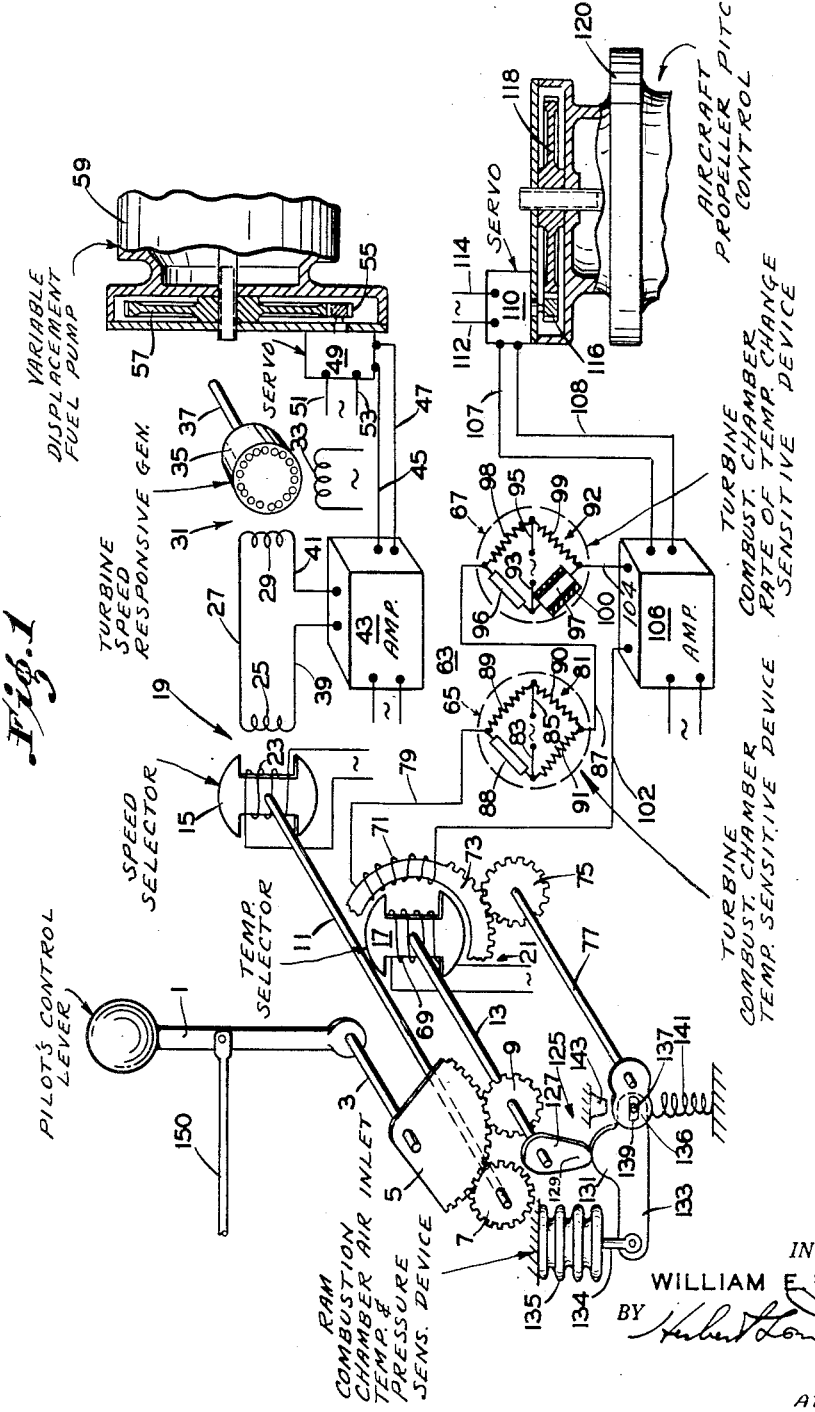

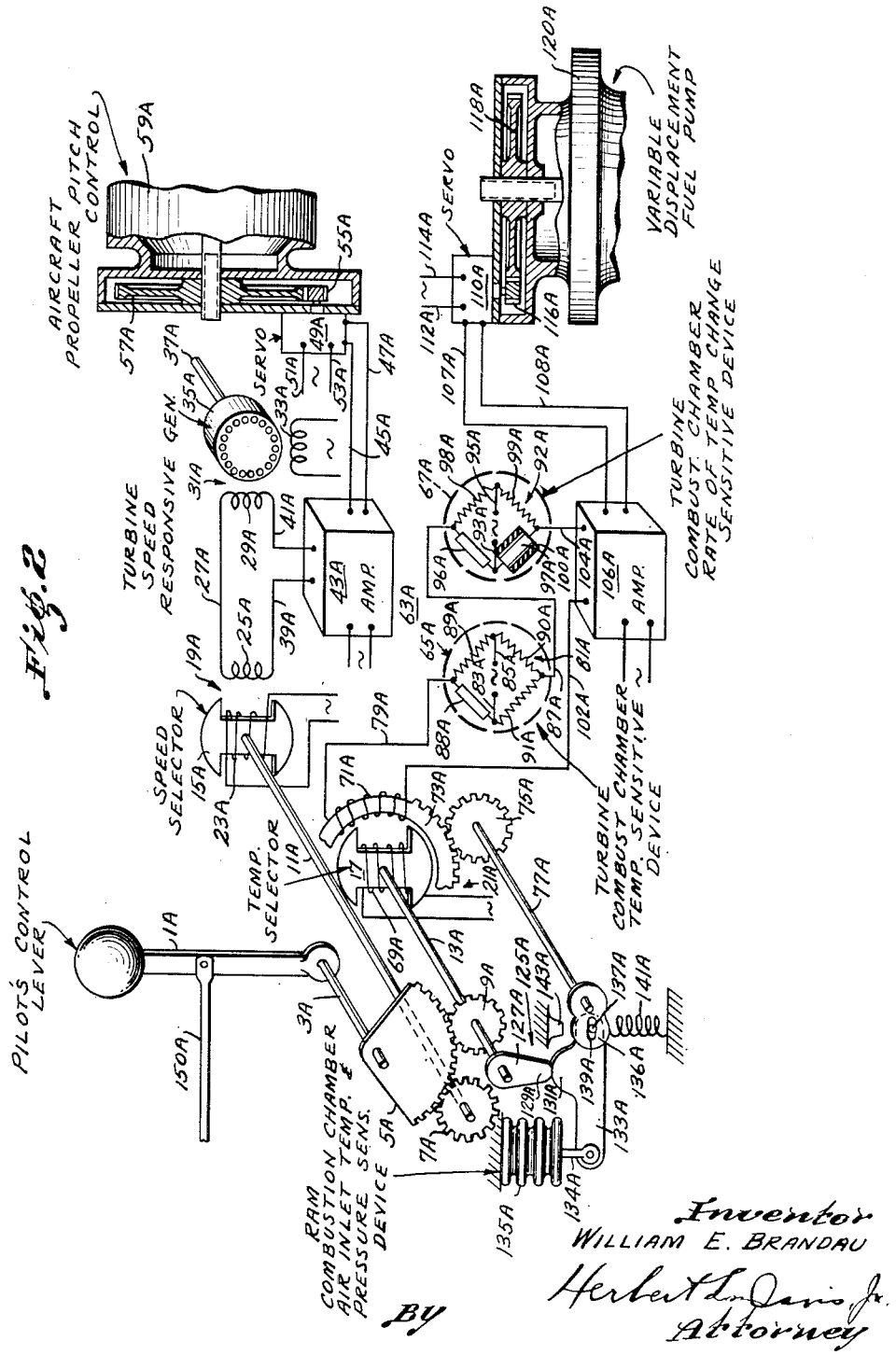

United States Patent Office 2,694,900
Patented Nov. 23, 1954

2,694,900

AIRCRAFT ENGINE POWER CONTROL TO MAINTAIN SELECTED COMBUSTION CHAMBER TEMPERATURE AND ENGINE SPEED CONDITIONS

William E. Brandau, Westwood, N. J., assignor to Bendix Aviation Corporation, Teterboro, N. J., a corporation of Delaware Application July 27, 1948, Serial No. 40,937

16 Claims. (Cl. 60—39.28)

The present application relates to a power control device and system for a turboprop or turbine driven aircraft engine and more particularly to a novel control system to regulate the supply of fuel to the engine to keep the engine running within safe temperature and speed limits, and control the amount of power that the engine is delivering.

The application relates to improvements in a power control of the type disclosed in the copending applications Serial No. 38,314, filed July 12, 1948, by James E. Bevins and Serial No. 40,918, filed July 27, 1948, by William R. Poyle and James E. Bevins.

An object of the invention is to provide a power control including a pilot's control lever operably connected to an emergency fuel control system of the type disclosed in copending application Serial No. 6,658, filed February 6, 1948, by Edward J. Hazen and the lever also operably connected to a pair of electrical variable coupling induction type transmitters or transformers to set the engine speed and also the engine load as determined by the engine temperature.

Another object of the invention is to provide a device which is cam controlled from the setting of the power control lever and affected by ram air pressure to adjust the stator of a temperature selecting variable induction type transformer so as to limit the maximum power that can be developed at low temperatures and low altitudes.

Another object of the invention is to include in the system a variable displacement piston type pump for supplying fuel to the engine and a speed sensing unit driven by the engine or engine temperature responsive device cooperating with one of the variable transformers for regulating the fuel so as to maintain the engine speed at the value selected by the position of a control lever.

Another object of the invention is to provide an engine temperature sensitive system for controlling the fuel supplied the engine or the pitch of an aircraft propeller driven by the engine so as to vary the load on the engine to maintain the engine temperature constant.

Another object of the invention is to control a fuel pump for a turboprop engine in a floating manner in accordance with the difference between a manually set speed and actual engine speed or manually set temperature and actual engine temperature.

Another object of the invention is to control the pitch of a turbine driven aircraft propeller in a floating manner in accordance with the difference between a set null temperature and a measured temperature of the combustion chamber plus the rate of change in the temperature thereof so that, upon an increase in such temperature, the propeller pitch angle decreases with a resultant increase in speed, which in turn works back through the speed control to reduce the fuel input and hence also reduce the resultant engine temperature back to the set value.

The above and other objects and features of the invention will appear more fully hereinafter from a consideration of the following description taken in connection with the accompanying drawings wherein an embodiment of the invention is illustrated by way of example.

Figure 1 is a diagrammatic view illustrating one form of the present invention.

Figure 2 is a diagrammatic view illustrating another form of the invention.

Referring to the drawing of Figure 1, a pilot's control lever 1 is mechanically coupled through a shaft 3, gear sector 5, pinion gears 7 and 9, and shafts 11 and 13 respectively to the rotors 15 and 17 of two variable coupling transformers 19 and 21 respectively.

Speed control

A rotor winding 23 of the transformer 19 is connected across a main source of constant alternating current and is inductively coupled to a stator winding 25 of the transformer 19. Connected in series with the stator winding 25 of the transformer 19 by a conductor 27 is an output winding 29 of a two-phase induction generator 31 of conventional type having an input winding 33 connected across the main source of alternating current and a rotor 35 driven by a turbine engine through a shaft 37, as shown, for example, in the aforesaid application Serial No. 40,918. Thus, the voltage induced in winding 29 will be proportional to the speed of the engine and at a frequency corresponding to that of the main source of alternating current connected across winding 33.

The winding 23 is arranged in relation to winding 25 so that the voltage induced from winding 23 into winding 25 will be 180 degrees out of phase with the voltage induced in winding 29 from the generator 31. The amplitude of the voltage induced in winding 25 will depend upon the coupling relation between winding 23 and winding 25, while the amplitude of the voltage induced in winding 29 will be dependent on the speed of the engine driving the generator rotor 35 through shaft 37.

When the voltage induced in winding 29 equals that induced in winding 25 no signal voltage will be applied across lines 39 and 41.

However, upon the voltage induced in winding 29 exceeding that induced in winding 25 a signal voltage will be applied across lines 39 and 41 having a phase relation indicating a speed of the engine in excess of that selected by the position of the rotor 15 of the variable coupling transformer 19, while upon the voltage induced in winding 25 exceeding that induced in winding 29 there will be applied to lines 39 and 41 a signal voltage having an opposite phase relation and indicating a speed of the engine less than that selected by the position of the rotor 15.

The lines 39 and 41 lead into an amplifier 43 including first a suitable demodulator which may be of a type such as discussed in an article by Britton Chance appearing in The Review of Scientific Instruments, volume 17, Number 10—October 1946.

From the demodulator the signal is carried as a D. C. voltage to a suitable error-rate stabilizing network which may be of a conventional type such as shown and discussed in Chapters VII and VIII of Servomechanism Fundamentals by Lauer, Lesnick and Matson.

The output of the error-rate stabilizing network may then be connected through a suitable modulator to a magnetic amplifier of a conventional type or the amplifier may be of a type such as shown in U. S. Patent No. 2,493,605, assigned to Bendix Aviation Corporation and granted January 3, 1950, on an application Serial No. 792,885, filed December 20, 1947, by Adolph Warsher.

From the amplifier 43 the signal voltage is carried by lines 45 and 47 to the control winding of a low inertia two-phase servo-motor 49 having its other winding connected by lines 51 and 53 to the main source of constant frequency alternating current.

The motor 49 drives a pinion gear 55 to adjust a control gear or screw jack 57 of a variable displacement piston pump 59 which may be of a conventional type driven by the engine.

Thus, upon the speed of the engine decreasing below that for which the variable coupling transformer 19 is set, a signal voltage applied through the control network of the amplifier 43 will be impressed across the motor control lines 45 and 47 of such a phase as to cause rotation of the control gear 57 in a direction to increase the displacement of the piston pump 59 and thereby increase the supply of fuel to the engine to in turn increase the speed of the engine to the selected value.

If the speed of the engine increases above that for which the transformer 19 is set, the signal voltage across lines 45 and 47 will have an opposite phase relation causing rotation of the motor 49 in an opposite direction to decrease the fuel supplied by pump 59 to the engine and thereby decrease the engine speed to the selected value.

It will be seen then that the voltage from the generator 31 creates a signal which opposes that of the transformer 19. The signal voltage of the generator 31 calls for less engine speed, while the signal voltage of the transformer 19 calls for increase in the speed of the engine. The predominating signal voltage, of course, controls the direction of rotation of the motor 49. The control network in the amplifier box 43 is arranged as previously indicated so that the proper amount of rate can be applied to prevent hunting and overshooting.

The bucking signals from the tachometer generator 31 arrest or reverse the motion of the low inertia motor 49 which is controlling the displacement of the fuel pump 59, to give a well-damped speed control to the turboprop engine.

Thus, if the power control lever 1 is set so that it calls for an increase in speed over that at which the turbine engine is running, the transformer 19 sends a signal voltage through the network of amplifier 43 which causes the low inertia motor 49 of the pump 59 to increase the displacement of the pump 59 to supply more fuel to the turbine engine. This, in turn, causes the engine to speed up and a signal is created by the speed sensitive generator 31 which is fed in the necessary direction to buck the signal from the transformer 19 calling for the increase in speed.

As a lower power and correspondingly lower speed is selected by the transformer 19, the opposite effect and results take place.

*Propeller pitch control*

Coupled to the power lever 1 is the second variable coupling transformer 21, which selects temperature and acts in a very similar manner to the first transformer 19, except that the tachometer generator 31 bucking signal is replaced by a resistance radiation bolometer indicated generally by the numeral 63 and which has two temperature responsive devices in it, one 65 to measure temperature and the other 67 to measure rate of change of temperature. The bolometer 63 is positioned at a suitable high temperature point in the combustion chamber of the turbine engine, as shown, for example, in the copending U. S. application Serial No. 40,918, and is subject to the temperature of the combustion gases.

The rotor 17 of the transformer 21 has a rotor winding 69 connected across the main source of constant alternating current and the rotor winding 69 is inductively coupled to a secondary winding 71 mounted on a gear segment 73 which may be rotated through a pinion gear 75 and shaft 77, as will be explained.

Connected in series with the secondary winding 71 by a conductor 79 is an A. C. bridge circuit 81 of the device 65. Connected across the bridge circuit 81 at input conductors 83 and 85 is the main source of alternating current having a constant frequency.

Output conductors for the bridge 81 include the conductor 79 and a conductor 87. A resistance element 88 variable with temperature forms one leg of the bridge circuit 81 while fixed resistances 89, 90 and 91 complete the A. C. bridge 81. The bridge circuit 81 has a balance or null temperature sufficiently low that normally the bridge circuit 81 will not balance within the normal range of operation of the turbine engine. The amplitude of the voltage across the output lines 79 and 87 increases with temperature and has a phase relation 180 degrees out of phase with the voltage induced in the secondary winding 71 by winding 69. The signal voltage across output lines 79 and 87 of the bridge circuit 81 normally balances that across winding 71 when the temperature of the combustion chamber gases of the engine equals the temperature selected by the position of the rotor 17 of the transformer 21.

Connected in series with the bridge circuit 81 of the temperature responsive device 65 through output conductor 87 is an A. C. bridge circuit 92 of the rate of temperature change device 67. The bridge circuit 92 has input conductors 93 and 95 which connect the bridge circuit 92 across the main source of alternating current and the bridge circuit 92 is normally balanced during these periods when there is no change in the temperature of the combustion gases. The bridge circuit 92 includes resistance elements 96 and 97 which are variable with temperature and form opposite legs of the normally balanced bridge circuit 92, while fixed resistances 98 and 99 complete the A. C. bridge 92. The resistance element 97 is provided with an insulating shield 100 so that there occurs a lag of the temperature affecting variable resistance 97 and tending to rebalance the bridge circuit 92 with respect to changes of temperatures effecting resistance 96. Rate correction is thus obtained by the action of the variable resistance element 97 which tends to rebalance the bridge circuit 92 after an elapse of time and cessation of change in temperature.

Conductor 102 leads from the secondary winding 71 of the variable coupling transformer 21 while conductor 104 leads from an output of the bridge circuit 92. The two conductors 102 and 104 lead to the input of a suitable torque amplifier 106 of conventional type or the amplifier 106 may be a servo-motor control of a type disclosed in the aforesaid Patent No. 2,493,605.

Upon a rise in the combustion chamber temperature in excess of the selected value and affecting bridge circuits 81 and 92, the output signal voltage from bridge 92 adds to that of the signal voltage from bridge 81 and the resultant voltage bucks the voltage induced in secondary winding 71 by rotor winding 69 to cause a signal voltage to input lines 102 and 104 of the amplifier 106 calling for a lower temperature.

Upon a decrease in the combustion chamber temperature below the selected value and affecting the bridge circuits 81 and 92 the output signal voltage from bridge 92 acts in opposition to that of the signal voltage from bridge 81 which tends to buck the voltage induced in the secondary winding 71 by rotor winding 60 to cause a signal voltage to input lines 102 and 104 of the amplifier 106 in an opposite phase and calling for a higher temperature.

Output lines 107 and 108 lead from the amplifier 106 to the control winding of a low inertia two phase servomotor 110 having its other winding connected by lines 112 and 114 to the main source of a constant frequency alternating current.

The motor 110 drives a pinion gear 116 to adjust a control gear or screw jack 118 for varying the pitch of a propeller through a mechanism indicated generally by the numeral 120 and which may be of conventional type. The propeller as hereinbefore indicated is driven by the turbine engine.

Upon an increase in the combustion chamber temperature above the value for which the transformer 21 is set, the signal voltage across lines 107 and 108 will be of such a phase as to cause rotation of the control gear 118 by motor 110 in a direction to decrease the propeller pitch angle and in turn permit an increase in the speed of the engine, which in turn works back through the speed control 31 to reduce the fuel input and hence also reduce the combustion chamber temperature back to the set value.

Of course, upon a decrease in the combustion chamber temperature below the set value, the signal voltage across lines 107 and 108 will have an opposite phase relation to cause rotation of the motor 110 in an opposite direction to increase the propeller pitch angle and in turn decrease the speed of the engine, which in turn works back through the speed control 31 to increase the fuel input and hence also increase the combustion chamber temperature back to the set value.

The result of the unbalance between the selected temperature and the actual temperature causes the load on the engine to be changed. This is accomplished, as explained, by the amplifier 106 of the temperature channel operating the low inertia motor 110 and gear train 116 and 118 of the propeller pitch control 120 to change the pitch of the propeller and hence the load on the engine. It will be noted that this channel also has displacement (element 65) as well as rate signals (element 67) to give a well damped and anti-hunting system.

By having such a control, the displacement necessary to give full corrective action is extremely small if the rate at which the unit is tending to deviate from the selected conditions is great.

*Maximum power control*

There is further provided a maximum power control limiter indicated generally in the drawing by the numeral 125. The latter device is controlled by a cam 127 affixed to the shaft 13 of the rotor 17 and having a portion 129 which cooperates with a raised portion 131 of a lever 133, when the pilot's control lever 1 is adjusted to a position approaching the maximum temperature and speed setting for the engine and corresponding to the position shown in the drawing. The raised portion 131 is positioned on the lever 133 intermediate the opposite ends thereof. One end of the lever 133 is connected by a link 134 to an expansible bellows 135 filled with air or other suitable pressure and temperature responsive gaseous medium. The outer surface of the bellows 135 is exposed to the ram air inlet pressure to the engine and is subject to the temperature of the ram air. Thus, under relatively high ram air pressures as at sea level or at relatively low altitudes, the bellows 135 tends to collapse, while the bellows 135 tends to expand under low ram air pressures such as at relatively high altitudes. Similarly, at high ambient temperatures, the air within the bellows 135 tends to expand the bellows 135, while at relatively low ambient temperatures the air within the bellows 135 tends to contract the bellows 135.

At such times as the cam 127 is adjusted so that lever 133 fulcrums thereon, the expansion and contracting of the bellows 135 at one end of the lever 133 causes a corresponding adjustment of the opposite end of the lever 133. The latter end of the lever 133 is connected to an arm 136 by a pin 137 projecting from the lever 133 into a slot 139 formed in the arm 136. The arm 136 is affixed to shaft 77 so that pivotal movement of the lever arm 133 in a clockwise direction on the cam 127 as upon the bellows 135 tending to collapse as at low temperatures and low altitudes a counter-clockwise movement is imparted to arm 136 which in turn causes through shaft 77, gear 75 and gear segment 73 movement of the secondary winding 71 in a direction relative to rotor winding 69 which in effect decreases the selected temperature setting and in turn causes a decrease in the fuel supplied the engine by pump 59 and in the engine speed.

At low power settings of the pilot's control lever 1, the portion 129 of cam 127 is adjusted to a position out of contacting relation with the portion 131 of the lever 133 whereupon a spring 141 acting on arm 136 biases arm 136 in a clockwise direction into contacting relation with a stop 143. The arm 136 is normally held in the latter position until such time as the cam portion 129 is once again adjusted so as to bring into operation the maximum power control 125.

It will be seen then that the maximum power control device 125 serves to rotate the secondary winding 71 of the temperature selecting transformer 21 so to limit the maximum power that can be selected under dangerous low temperature and altitude conditions.

At safe high altitudes and ambient temperature conditions, expansion of the bellows 135 causes a counter-clockwise movement of lever 133 and clockwise rotation of arm 136 into contacting relation with stop 143 so as to permit full maximum temperature selection through operation of the selector transformer 21.

At such high altitude and ambient temperature conditions, the inlet air to the engine has a sufficiently low density as to avoid the dangerous power conditions aforenoted.

Emergency fuel control

The foregoing system is designed to operate in conjunction with an emergency fuel system which forms the subject matter of the aforesaid application Serial No. 6,658 and which may be interconnected to the pilot's control lever 1 through a link 150.

Operation of the latter system is based on balancing nozzle pressure against ram air inlet pressure to the engine or compressor discharge pressure, to control a bypass in the emergency pump discharge line as shown in the latter application. The emergency fuel control is designed to cut in automatically whenever the fuel nozzle pressure decreases without a throttle change and approaches a pressure corresponding to a pre-selected percentage of a turbine power speed. It will function at any setting of the pilot's control lever 1, and may be manually operated through a linkage 150 to the main control lever 1 to control the turbine power at any desired point. The emergency fuel control is claimed and more fully disclosed in the aforesaid application Serial No. 6,658.

Operation

The power control unit is designed to pump the proper amount of fuel to the combustion chamber of a turbine or aircraft engine and so adjust the pitch of a propeller driven by the engine that turbine combustion chamber temperature and turbine speed are maintained constant at values preselected by the motion of a single pilot operated control lever 1 and under all conditions of flight attitude, temperature and altitude.

Turbine speed control is obtained by comparing the voltage output of an A. C. generator 31 driven by the turbine with that of a selector variable coupling transformer 19. The difference in signal is amplified to operate a low inertia motor 49 which changes the displacement of a variable stroke fuel pump 59 through a suitable gear train. Thus, more or less fuel will be delivered as required to nullify the unbalanced signal.

Turbine temperature or load control is obtained by measuring the temperature of the combustion chamber gas with a resistance bolometer 63 and comparing its signal with that of a selector variable coupling transformer 21 which is geared to the speed control transformer 19 thereby permitting a single power control lever 1 to control both speed and temperature of the engine. The unbalanced signal voltage is amplified to operate a low inertia motor 110 which controls the propeller pitch through the mechanism 120 and which in turn works back through the speed responsive generator 31 to vary the fuel supplied the engine by pump 59.

Thus, more or less fuel will be delivered as required to nullify the unbalanced signals. With this system, it will be seen that a preselected engine combustion chamber temperature and engine speed will be maintained under varying flight conditions.

A maximum power control 125 is further provided so arranged that under certain sea level conditions with low ambient temperatures and great air density the selector variable coupling transformer 21 will be retarded in accordance with an inherent schedule. A cam 127 is arranged to permit this action to occur only at the maximum power position of the pilot's control lever 1.

Alternative form

An alternative form of the invention is shown in Figure 2 in which the mechanism 59A may control the pitch of the propeller, while the mechanism 120A may be a variable displacement pump. The control mechanism of the drawing remains otherwise the same as that in Figure 1 and like numerals with the suffix A indicate corresponding parts to those heretofore described with reference to Figure 1

In the arrangement of Figure 2, turbine temperature control is obtained by measuring the temperature of the gas stream entering the nozzle box of the turbine by means of the device 63A or temperature responsive resistance device 88A and comparing its signal on a bridge circuit 81A with that of a selector transformer 21A. The unbalanced signal is amplified through the amplifier 106A to operate and control the direction of rotation of a motor 110A which changes the displacement of a variable stroke fuel pump 120A through a suitable gear train 116A—118A. Thus, more or less fuel will be delivered by the pump 120A to the combustion chamber of the engine to nullify the unbalanced signals. With this system, it will be seen that a preselected temperature will be maintained. Rate correction may be obtained by thermally weighting the bolometer element 97A relative to the element 96A so that the element 96A responds more rapidly to change in temperature than the element 97A, as previously described.

Speed control is obtained by comparing the voltage output of an engine driven A. C. generator 31A with that of the selector transformer 19A. The difference or signal voltage is amplified through the amplifier 43A to operate and control the direction of rotation of the motor 49A which controls the propeller pitch changing mechanism 59A so as to vary the engine load to nullify the unbalanced signal and maintain a preselected engine speed.

Although only two embodiments of the invention have been illustrated and described, various changes in the form and relative arrangements of the parts may be made to suit requirements.

What is claimed is:

1. For use with an aircraft engine having a combustion chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means so as to effect a predetermined combustion gas temperature and driven speed of said member, said speed responsive regulating means including a generator having a constant frequency output and an output voltage variable with the driven speed of said member, and a variable induction transformer operatively connected to said generator output to set the driven speed of said member.

2. For use with an aircraft engine having a combustion chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means so as to effect a predetermined combustion gas temperature and driven speed of said member, said temperature responsive regulating means including an alternating current bridge circuit, a resistance element in said bridge circuit variable with the combustion gas temperature to vary the voltage output from said bridge circuit with said temperature, and a variable induction transformer operatively connected to said bridge output to set the combustion gas temperature.

3. For use with an aircraft engine having a combustion chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means so as to effect a predetermined combustion gas temperature and driven speed of said member, said temperature responsive regulating means including an alternating current bridge circuit, a resistance element in said bridge circuit variable with the combustion gas temperature to vary the voltage output from said bridge circuit with said temperature, a variable induction transformer operatively connected to said bridge output to set the combustion gas temperature, a normally balanced second alternating current bridge circuit serially connected in the output of said first mentioned bridge circuit, a first resistance element variable with the combustion gas temperature in one leg of the second bridge circuit, a second resistance element variable with the combustion gas temperature in another leg of the second bridge circuit, said first resistance element more rapidly responsive to change in said temperature than said second element so as to unbalance said second bridge circuit in one sense during said temperature increase and in an opposite sense during said temperature decrease so as to apply a compensating voltage to the output voltage of said first mentioned bridge circuit and which compensating voltage varies with the rate of change in the temperature of said combustion gases.

4. For use with an aircraft engine having a combustion chamber, and a member driven under variable speed and load conditions by combustion gases from said chamber; the combination comprising first regulating means reponsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means so as to effect a predetermined combustion gas temperature and driven speed of said member, said speed responsive regulating means including a generator having a constant frequency output and an output voltage variable with the driven speed of said member, and a first variable induction transformer operatively connected to said generator output to set the driven speed of said member; and said temperature regulating means including an alternating current bridge circuit, a resistance element in said bridge circuit variable with the combustion gas temperature to vary the voltage output from said bridge circuit with said temperature, and a second variable induction transformer operatively connected to said bridge output to set the combustion gas temperature; and a pilot's control lever operatively connected to said first and second variable induction transformers to effect simultaneous selection of the combustion gas temperature and driven speed of said member.

5. For use with an aircraft engine having a combustion chamber, an air inlet to said chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to said first regulating means and the other of said control means being operatively connected to said second regulating means so as to effect a predetermined combustion gas temperature and engine speed, manually operable control means connected to said first and second regulating means for selecting said predetermined combustion gas temperature and engine speed, means for limiting the maximum selected temperature, means sensitive to changes in the density of the inlet air and operatively connected to said limiting means for decreasing the selected temperature with increase in the density of the inlet air to the combustion chamber, means for transferring said limiting means from an operative to an inoperative relation, and means operatively connecting the manually operable control means to said transferring means for transferring said limiting means to said inoperative relation upon adjustment of said manually operable control means to within a predetermined range.

6. For use with an aircraft engine having a combustion chamber, an air inlet to said chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to said first regulating means and the other of said control means being operatively connected to said second regulating means so as to effect a predetermined combustion gas temperature and engine speed, manually operable control means connected to said first and second regulating means for selecting said predetermined combustion gas temperature and engine speed, means for limiting the maximum selected temperature, means sensitive to changes in the density of the inlet air and operatively connected to said limiting means for decreasing the selected temperature with increase in the density of the inlet air to the combustion chamber, said manually operable control means including a single manually operable element and means operatively connecting the element to the first and second regulating means for simultaneously selecting the predetermined combustion gas temperature and engine speed, and other means operatively connecting said manually operable element to the limiting means for transferring said limiting means from an operative to an inoperative relation upon selection of an engine speed less than a predetermined value.

7. For use with an aircraft engine having a combustion chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means so as to effect a predetermined combustion gas temperature and engine speed, a single pilot's control lever operatively connected to said first and second regulating means for simultaneously selecting said predetermined combustion gas temperature and engine speed, and temperature and atmospheric pressure responsive means effective to limit the maximum temperature that may be selected at relatively low ambient temperatures and high ambient atmospheric pressures.

8. The combination defined by claim 7 in which said last mentioned means includes a bellows responsive to ambient air pressure and temperature for effecting an overriding control of said temperature regulating means at a maximum speed setting of said speed regulating means.

9. For use with an aircraft engine having a combustion chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means, means for changing the datum of said first and second regulating means, a control lever for operating said datum changing means to select the combustion gas temperature and engine speed, ambient air temperature and pressure responsive means, and means operatively connecting said last mentioned means to said datum changing means to effect a decrease in the selected temperature under predetermined unsafe air conditions.

10. A control mechanism comprising in combination, engine speed responsive regulating means, engine temperature responsive regulating means, engine fuel control means, engine load control means, one of said control means being operatively connected to one of said regulating means and the other of said control means being operatively connected to the other of said regulating means to effect a predetermined engine speed and temperature, means for changing the datum of said engine speed regulating means, other means for changing the datum of said engine temperature regulating means, a control member operatively connected to said first and second mentioned datum changing means for effecting simultaneous selection of engine temperateure and speed, ambient air temperature and pressure responsive means, means to connect said last mentioned means to said temperature datum changing means, means for disconnecting said air temperature and pressure responsive means from the temperature datum changing means, and said disconnecting means operatively connected to said control member and effective at a predetermined position of said control member to disconnect said air temperature and pressure responsive means from the temperature datum changing means.

11. The combination defined by claim 10 in which said air temperature and pressure responsive means includes an air filled bellows exposed to engine air inlet pressure and temperature, said connecting means includes a lever operatively connecting said bellows and temperature datum changing means, and a cam upon which said lever may be fulcrumed when in operative relation, and said disconnecting means includes a shaft connecting said control member and cam to effect adjustment of said cam out of fulcruming relation with said lever and said bellows out of operative relation with said temperature datum changing means upon adjustment of said control member to a predetermined position.

12. In a temperature regulator for the combustion chamber of an aircraft engine, a pair of inductively coupled windings to set the regulated temperature for said combustion chamber, both said inductively coupled windings being movable in relation one to the other, manually controlled means to move one of said windings to select the regulated temperature, ambient air condition responsive means to move the other of said windings to reset the selected regulated temperature in a decreasing sense with increase in the density of the ambient air, said condition responsive means including a temperature responsive member to decrease the selected regulated temperature with increase in the density of the ambient air.

13. In a temperature regulator for the combustion chamber of an aircraft engine, a pair of inductively coupled windings to set the regulated temperature for said combustion chamber, both said inductively coupled windings being movable in relation one to the other, manually controlled means to move one of said windings to select the regulated temperature, ambient air condition responsive means to move the other of said windings to reset the selected regulated temperature in a decreasing sense with increase in the density of the ambient air, said condition responsive means including a bellows responsive to both ambient air temperature and pressure to decrease the selected regulated temperature with increase in the density of the ambient air.

14. In a temperature regulator for the combustion chamber of an aircraft engine having an air inlet to said chamber, the combination comprising inductive coupling means to set the regulated temperature for said combustion chamber, said inductive coupling means including a pair of elements movable in relation one to the other, manually controlled means to move one of said elements to select the regulated temperature, means responsive to changes in the density of the inlet air and operatively connected to the other of said elements for moving said other element to reset the selected regulated temperature under predetermined unsafe air inlet density conditions, means for disconnecting said air inlet density responsive means from the other of said elements, and means connecting said manually controlled means to said disconnecting means to effect such disconnection upon adjustment of said manually controlled means within a predetermined range.

15. An engine regulator comprising in combination, a first variable induction transformer to set regulated engine speed, a second variable induction transformer to set regulated engine temperature, each of said transformers including a pair of elements movable in relation one to the other, manually operable means to move one of the elements of each of said transformers to simultaneously set regulated engine speed and temperature, and maximum power limiting means to move the other element of one of said transformers to reset the relationship between the regulated engine speed and temperature during predetermined unsafe conditions.

16. For use with an aircraft engine having a combustion chamber, and a member driven under variable speed and load conditions by combustion gases from said chamber; the combination comprising first regulating means responsive to the driven speed of said member, second regulating means responsive to the temperature of the combustion gases, means for controlling supply of fuel to said combustion chamber, and means for controlling the load applied to said driven member, one of said control means being operatively connected to one of said regulating means and the other of said control means being operatively connected to the other of said regulating means so as to effect a predetermined combustion gas temperature and driven speed of said member, said temperature responsive means having a constant frequency alternating current output and an output voltage variable with the combustion gas temperature, means operatively connected to said output to normally balance the output of said temperature responsive means and set the combustion gas temperature, a normally balanced alternating current bridge circuit operatively connected to the output of said temperature responsive means, a first resistance element variable with the combustion gas temperature in one leg of the bridge circuit, a second resistance element variable with the combustion gas temperature in another leg of the bridge circuit, said first resistance element more rapidly responsive to change in said temperature than said second element so as to unbalance said bridge circuit in one sense during said temperature increase and in an opposite sense during said temperature decrease so as to apply a compensating voltage to the output voltage of said temperature responsive means and which compensating voltage varies with the rate of change in the temperature of said combustion gases.

References Cited in the file of this patent

UNITED STATES PATENTS

| Number | Name | Date |
|---|---|---|
| 2,079,466 | Phillips | May 4, 1937 |
| 2,115,086 | Riggs | Apr. 26, 1938 |
| 2,219,994 | Jung | Oct. 29, 1940 |
| 2,275,317 | Ryder | Mar. 3, 1942 |
| 2,306,953 | Jung | Dec. 29, 1942 |
| 2,367,869 | Jones | Jan. 23, 1945 |
| 2,447,124 | Kalitinsky et al. | Aug. 17, 1948 |
| 2,457,595 | Orr | Dec. 28, 1948 |